Patented Sept. 30, 1952

2,612,492

UNITED STATES PATENT OFFICE 2,612,492

SOLUBLE COPOLYMERS OF DIALLYLIC PHTHALATES AND ALLYLIC ALCOHOLS

Pliny O. Tawney, Passaic, N. J., assignor to United States Rubber Company, New York, N. Y., a corporation of New Jersey No Drawing. Application September 12, 1945, Serial No. 615,927

6 Claims. (Cl. 260—78.5)

My invention comprises a method for preparing a new class of unsaturated polymeric materials of relatively low molecular weight which are soluble in a variety of organic liquids, but which are convertible to insoluble, infusible resins in the presence of heat and/or catalysts, by further polymerization or by copolymerization with reactive compounds containing an ethylenic linkage. More particularly, my invention relates to unsaturated, polymeric materials derived from a diallylic phthalate.

It is well-known that the polymerization of a diallylic phthalate leads to the formation of an insoluble gel after a relatively small amount of the monomer has been converted to the polymeric form. The resulting mixture, which consists of a minor proportion of insoluble, infusible polymeric diallylic phthalate suspended in and swollen by a major proportion of unreacted monomeric diallylic phthalate together with a small amount of low molecular weight polymer, is exceedingly difficult to manipulate in various processing operations and is practically devoid of commercial utility. For example, its use in coating compositions is severely restricted by its inability to dissolve completely in organic solvents, and even when applied directly, i. e., in the absence of solvents, the resulting films are weak, uneven, non-uniform and unattractive because of the presence of lumps of gelled polymer. Similarly when the mixture is cast in bulk by heating in a mold with additional catalyst until further polymerization occurs, the resulting castings are structurally weak and characterized by highly pronounced strain patterns.

A number of devices have been proposed to overcome the above-mentioned disadvantages and render the polymers of diallylic phthalates commercially useful. A procedure frequently employed (U. S. Patent No. 2,218,439) consists in halting the polymerization of the diallylic phthalate short of the point at which the formation of an insoluble phase becomes apparent (i. e., the gel point). The resulting product, however, contains only a relatively small amount of soluble, partially polymerized diallylic phthalate admixed with a much larger proportion of unreacted monomer which must be laboriously isolated and recycled for use in subsequent polymerizations. The polymer itself must be purified by dissolving it in a solvent and reprecipitating it with a nonsolvent. Obviously such a procedure is both expensive and time-consuming.

The proposed uses of reaction temperatures above 180° C. and/or large amounts of catalyst as set forth in U. S. Patent No. 2,273,891 to increase the yield of soluble poly-diallylic phthalate are objectionable since under such vigorous conditions the polymerization is less amenable to control and premature insolubilization of the reaction mixture becomes even more difficult to avoid. Moreover, the recommended use of large amounts of peroxidic catalysts appreciably increases the overall cost of the polymerization and contaminates the polymeric product with the fragments and decomposition products of the catalyst.

Polymerization of diallylic phthalates in the presence of organic and inorganic inhibitors, such as hydroquinone and copper salts, have been recommended in U. S. Patent No. 2,273,891 and U. S. Patent No. 2,339,058 as a means of increasing the yield of soluble polymer prior to gelation. However, in practice it is necessary to carry out a very careful and complete separation of these inhibitors from the polymeric product to avoid discoloration thereof as well as retardation or complete inhibition of its subsequent conversion to the insoluble infusible state. On a commercial scale this separation is particularly laborious and time-consuming and adds to the overall cost of the product.

The above-mentioned patents also propose to carry out the polymerization of diallylic phthalates in the presence of solvents, in order to improve the yield of ungelled polymer. However, this method requires the use of relatively large amounts of solvents which is disadvantageous since the rate of polymerization tends to decrease in dilute solution, particularly when conducted only at the low reaction temperatures attainable by refluxing solutions of the diallylic phthalate in the low-boiling solvents commonly employed, e. g., acetone, carbon tetrachloride, etc. Furthermore, polydiallylic phthalates prepared in carbon tetrachloride solution, as described in U. S. Patent No. 2,339,058, tend to discolor badly at elevated temperatures, especially when in contact with metals, which limits their usefulness in baking enamels, heat-resistant coatings, castings, etc. The polymerization of diallylic phthalates in aqueous emulsions as mentioned in U. S. Patent No. 2,218,439 has proven inferior even to the above-mentioned organic solvents with respect to the yield of soluble unsaturated polymer obtained.

The copolymerization of a diallylic phthalate with a readily homopolymerizable monomer leads rapidly to the formation of an insoluble cross-linked product before more than a very minor amount of the diallylic phthalate has become incorporated in the copolymer. This is indicated by Garvey and Alexander in U. S. Patent No. 2,202,846. Hence, the copolymerization of diallylic phthalates with various polymerizable monomers has been shown by the art to be of little utility in securing high yields of soluble unsaturated polymers and these copolymerizations are therefore open to the same objections previously cited for the homopolymerization methods.

I have now unexpectedly discovered that by polymerizing a mixture of diallylic phthalic with a monomer which itself possesses little tendency to homopolymerize, specifically an allylic alcohol from the class consisting of allyl alcohol, beta-alkylallyl alcohols, and gamma-alkylallyl alcohols, high yields of a soluble, fusible, unsaturated copolymer can be obtained. In further contrast to the prior art, the preparation of my new copolymers, by which the major proportion of a monomeric diallylic phthalate can be converted to the polymeric form without insolubilization, does not require the presence of inhibitors or of any solvents other than the copolymerizable monomers themselves.

The copolymerizable allylic alcohols employed in my invention have proven remarkably efficient in repressing gelation even when they are present in the reaction mixture in relatively small amounts.

In addition to their manifest utility, my new copolymers are unique in regard to their chemical structure since a soluble, fusible unsaturated copolymer of a diallylic phthalate and an allylic alcohol appears unknown in the prior art.

That my products are true copolymers is proven by elementary analysis and other specific tests. They contain attached to the polymer chain unsaturated ester groups which can be polymerized to convert the copolymers to insoluble cross-linked products. These unsaturated ester groups will also undergo alcohol interchange reactions with other saturated and unsaturated alcohols. My products also contain alcoholic hydroxyl groups in the form of side-chain hydroxymethyl groups which permit modification of the copolymers by agents known to react with alcohols, such agents including alkyl, allylic and acyl halides, organic acids and their anhydrides, organic isocyanates and isothiocyanates as well as the corresponding poly-functional compounds such as the dihalides, diisocyanates, poly-carboxylic acids, etc.

Thus I have succeeded in producing a new and useful class of soluble convertible resins derived from a diallylic phthalate which are obtained easily and in such high yields as to be of immediate commercial interest. In contrast to the prior art I can convert the major proportion of a monomeric diallylic phthalate to the polymeric form without insolubilization. The copolymerization reaction, which requires only relatively small amounts of catalyst, proceeds smoothly at moderate temperatures, and can be economically conducted in conventional and readily available reaction vessels without the need for special reaction conditions or other precautions to avert premature gelation. The resulting soluble unsaturated copolymers which are obtained in high yields are uniform in character since they are uncontaminated with the high molecular weight insoluble gel encountered in many of the prior art polymers of diallylic phthalates, and hence the necessity for extensive purification is obviated. My new copolymers totally dissolve in a number of common organic solvents and they cure rapidly and completely to the insoluble, infusible state with little or no discoloration even when heated as high as 200° C. This combination of attributes makes my products well suited to the formation of coating compositions, particularly baking varnishes and white enamels.

Of the diallylic phthalates useful in preparing my new copolymers, I prefer diallyl phthalate and dimethallyl phthalate. Among the operable alcohols, allyl alcohol and methallyl alcohol, both of which are readily available, have proven satisfactory although other beta or gamma-substituted allyl alcohols, such as 2-ethylallyl and 3-methylallyl alcohol are also useful in my invention. In general, the copolymerization of an allylic alcohol with the phthalic ester of a different allylic alcohol, e. g., methallyl alcohol or crotyl alcohol, (i. e., gamma-methyallyl alcohol) with diallyl phthalate, tends to give the maximum yield of copolymeric product.

The relative proportions of the allylic alcohol and the diallylic phthalate can be varied over a considerable range depending upon the physical properties and the amount of hydroxyl groups desired in the resulting product. Copolymerization of the diallylic phthalate with as little as approximately 10% of the allylic alcohol (based on the weight of the diallylic phthalate) is sufficient to repress the gelation of the reaction mixture during the early stages of the copolymerization and to insure an increased yield of soluble unsaturated product. The higher the amount of copolymerizable allylic alcohol present, the higher the amount of the monomeric diallylic phthalate which can be converted to the copolymeric form without insolubilization. Optimum yields of the soluble products are obtained when the amount of the allylic alcohol is in the neighborhood of 100% by weight of the diallylic phthalate. Since my copolymers are readily soluble in allylic alcohols, the copolymerizations may be carried out in the presence of still higher amounts, say up to 200%, of the allylic alcohol, if desired, for the resulting mobile, free-flowing solutions have desirably low viscosities and are easily handled in transfer, mixing, storage and other mechanical operations to which the solid copolymers themselves may be less amenable. In such cases the allylic alcohol serves in the dual role of a copolymerizable monomer and a cheap volatile solvent which, because it possesses little tendency to homopolymerize under these conditions, can be easily removed from the reaction mixture by distillation and recovered for use in subsequent copolymerizations.

In the preparation of my new copolymers, the reaction temperatures may range from about 25° C. up to and somewhat above the boiling point of the allylic alcohol, and for overall economy it is preferred to operate in the latter range, i. e., at the reflux temperature of the reaction mixture. Higher temperatures can of course be employed but the necessary pressure equipment entails additional expense without offering any marked compensating advantages. Suitable polymerization catalysts include hydrogen peroxide, acetyl peroxide, benzoyl peroxide, acetyl benzoyl peroxide, succinyl peroxide and tertiary-butyl hydrogen peroxide. The course of the copolymerization can be followed by observing the increase in viscosity of the reaction mixture and after halting the reaction by cooling, the copolymer can be readily isolated from the reaction mixture by distilling off any unreacted starting materials or by extracting them with a solvent in which the copolymer is insoluble, such as gasoline. Although generally unnecessary, the copolymer can be further refined, if desired, by dissolving it in a solvent such as acetone and precipitating it with a non-solvent such as gasoline.

The resulting polymeric material can be cast or molded in a known manner to form rods, blocks and sheets, etc. It can also be dissolved in appropriate solvents and employed as a lacquer or as an impregnating and water-proofing composition. In the preparation of such solutions it is unnecessary to isolate the copolymer as is done in the prior art, for the higher-boiling solvents can be added directly to the crude copolymerization reaction mixture and any unreacted allylic alcohol can be then removed by distillation. This effects a further saving in both the time and expense of the process, and adds to the economic advantage of my copolymers.

starred (*) in Table I below which still show no signs of gelation after heating for the times indicated. The reactions are then halted by cooling and the reaction mixtures are poured into gasoline. The precipitated materials are further purified by dissolving them in chloroform, and precipitating them with gasoline after which they are dried to constant weight in vacuo and the yields determined.

The pertinent data are summarized below in Table I including the weights of the copolymerizable monomers, peroxide and polymeric product, as well as the reaction times. For purposes of comparison only, the polymerization of a diallylic phthalate in the absence of an allylic alcohol (I–a and –d) and also in the presence of solvents (I–k and –l) are included to illustrate more fully the advantage of the copolymers of my invention.

*Table I*

| | Dimethallyl Phthalate | Diallyl Phthalate | Allyl Alcohol | Methallyl Alcohol | Crotyl Alcohol | Peroxide | Reaction Time (hours) | Yield |
|---|---|---|---|---|---|---|---|---|
| a | 100 | | | | | 5.50 | 15.0 | 42.6 |
| b | 100 | | | 26.30 | | 8.75 | 150.0* | 62.5 |
| c | 100 | | 21.20 | | | 3.79 | 160.0* | 54.5 |
| d | | 100 | | | | 0.311 | 11.0 | 28.1 |
| e | | 100 | 7.86 | | | 0.830 | 16.0 | 45.0 |
| f | | 100 | 11.80 | | | 0.934 | 26.0 | 57.5 |
| g | | 100 | 15.70 | | | 1.040 | 52.0* | 59.2 |
| h | | 100 | 23.60 | | | 4.96 | 22.0* | 82.0 |
| i | | 100 | 28.80 | | | 8.300 | 20.0 | 89.7 |
| j | | 100 | | | 29.2 | 5.17 | 65.0* | 63.3 |
| k | | 100 | 29.2 parts of carbon tetrachloride | | | 2.48 | 4.75 | 76.0 |
| l | | 100 | 100.0 parts of benzene | | | 0.621 | 52.5 | 50.3 |

*No sign of incipient gelation.

Application of heat to compositions containing my unsaturated copolymers, particularly in the presence of catalysts, induces further polymerization and the resulting cross-linked products are quite indifferent to heat and are strongly resistant to attack by solvents. Suitable dyes, pigments, fillers, plasticizers and resins can be incorporated with my copolymers in the soluble, fusible stage prior to final cure.

My soluble, unsaturated copolymers can also be converted to the insoluble, infusible state by interpolymerization with reactive monomers containing an ethylenic linkage, e. g., methyl acrylate, vinyl acetate, diethyl fumarate, allyl acrylate, diallyl fumarate, etc. At the soluble stage my copolymers dissolve readily in a number of these reactive monomers to yield solutions which are often quite fluid, even at high solids content. Such solutions can be totally polymerized leaving no solvent to be evaporated, and are useful not only as coating compositions, but particularly in casting, laminating and impregnating operations where articles capable of being pre-formed and then "set" or cured in a final shape are desired.

The following examples disclose my invention in more detail. All parts are by weight.

EXAMPLE 1

To demonstrate my discovery that copolymerization of a diallylic phthalate with an allylic alcohol represses gelation of the reaction mixture and thereby increases the yield of soluble, fusible polymeric material, mixtures containing various proportions of diallylic phthalates and allylic alcohols are heated with tertiary-butyl hydrogen peroxide (60% solution) as catalyst at 120° C. in sealed vessels until the point of incipient gelation is attained—save in the cases Comparison of I–d with I–e of the above table illustrates the effect of copolymerizing even small amounts of an allylic alcohol with a diallylic phthalate in repressing gelation and increasing the yield of soluble unsaturated polymeric product, while I–f, g, h and i show that the yield of soluble copolymer increases with the presence of increasing amounts of the copolymerizable allylic alcohol in the initial mixture of reactants. A comparison of I–k and I–l with I–h or I–i demonstrates the greater efficiency of the copolymerizable allylic alcohol (as compared with inert non-olefinic solvents) in repressing gelation and increasing the yield of soluble polymeric material. Example I–j shows that my discovery includes not only the allyl and beta-alkylallyl alcohols but the gamma-alkylallyl alcohols as well.

EXAMPLE 2

A mixture of 246.0 parts of diallyl phthalate, 58.0 parts of allyl alcohol and 12 parts of a 60% solution of tertiary-butyl hydrogen peroxide is refluxed for 40.5 hours. An aliquot of seventy-two and five-tenths parts of the clear viscous reaction mixture is withdrawn and poured into gasoline. The precipitated product is further purified by repeated solution in chloroform and precipitation with gasoline. After drying in vacuo to constant weight, 31.0 parts of polymeric solid are obtained. This corresponds to a total yield of approximately 134 parts of the copolymer.

Analysis—
Found: C, 67.18%; H, 6.60%;
Iodine number (Wijs) 60.7.

The analysis corresponds to a copolymer containing approximately 82.2% by weight of diallyl phthalate and 17.8% of allyl alcohol. The iodine number of the copolymer indicates the presence of unsaturation derived from the interpolymerized diallyl phthalate units while the presence of interpolymerized allyl alcohol units is unequivocably demonstrated by treating the copolymer with a hydroxyl-reactive agent, i. e., an isocyanate, as follows.

Ten parts of the purified copolymer are dissolved in 50 ml. of pure anhydrous pyridine and after adding to the solution 6.1 parts of phenyl isocyanate, the mixture is heated in a sealed tube for 19 hours at 90° C. The majority of the pyridine and any unreacted phenyl isocyanate are then removed from the reaction mixture by evacuation at room temperature and the syrupy residue is poured into 200 ml. of gasoline. The precipitated polymeric urethane is freed from impurities by dissolving it in 50 ml. of chloroform, precipitating it with 200 ml. of gasoline and washing with 100 ml. of diethyl ether. After repeating this purification procedure three times the polymeric urethane is dried in vacuo to constant weight.

Analysis.—Found: N, 2.15%.

The presence of nitrogen in this modified copolymer clearly demonstrates that the original product must contain free hydroxyl groups which are of course reactive to phenyl isocyanate, forming a polymeric phenyl urethane.

a. From the crude polymerization reaction mixture above an aliquot of 100.0 parts is withdrawn and admixed with 10.3 parts of monomeric diethyl fumarate. A trace of hydroquinone is added to inhibit premature copolymerization of the monomer with the copolymer and the mixture is distilled at 90° C. and 3 mm. for 1.5 hours during which time 13.0 parts of unreacted allyl alcohol from the original copolymerization reaction mixture are removed. The resulting solution is cooled and 0.3 part of benzoyl peroxide is added. A sample of the solution is used to impregnate two plies of glass cloth which are firmly bonded together by heating at 120° C. for 15 minutes. The resulting laminate is hard, tough, tack-free at 120° C., and is resistant to attack by organic solvents.

b. In the manner of (a) above, 23.3 parts of the crude reaction mixture are admixed with 3.7 parts of diallyl fumarate; three and seven-tenths parts of allyl alcohol are distilled out, and then 0.25 part of benzoyl peroxide is added and the solution heated in a mold at 60° C. for 12 hours and then at 120° C. for 2 additional hours to form a clear hard casting which is insoluble in organic solvents and substantially infusible.

EXAMPLE 3

A mixture of 492 parts of diallyl phthalate, 232 parts of allyl alcohol and 80 parts of a 30% aqueous solution of hydrogen peroxide is heated for 64 hours at 95° C. The reaction mixture is diluted with 400 parts of xylene and heated at approximately 30° C. and 3 mm. until 650 parts of a xylene-allyl alcohol mixture have distilled out. Two hundred more parts of xylene are then added and heating continued until 186 additional parts of distillate are collected. From the residual solution of the copolymer in xylene an aliquot of 17.6 parts is withdrawn and poured into an excess of gasoline. The precipitated copolymer is further purified by solution in chloroform and precipitation with gasoline. After drying in vacuo, 7.1 parts of a white polymeric solid are obtained. A 70% solution (by weight) of the copolymer in acetone has a viscosity of 0.85 poise at 25° C. The copolymer itself is compatible with a drying-oil-modified alkyd resin prepared by reacting 440 parts of refined linseed oil, 95 parts of glycerine, 424 parts of diethylene glycol and 490 parts of maleic anhydride until the reaction product has an acid number of 61.0.

Another sample of the xylene solution of the copolymer is diluted with 20% by weight of xylene and flowed onto a glass panel. After baking for 20 minutes at 200° C. a clear, solvent-and-heat-resistant film is obtained. Very little discoloration occurs when the film is baked at 200° C. for an additional 40 minutes. In contrast, a film of diallyl phthalate polymer, which had been polymerized in the presence of carbon tetrachloride according to a method shown in U. S. Patent No. 2,339,058 and baked on glass is discolored, and disintegrates upon contact with acetone. A similar film of diallyl phthalate polymer when baked on a steel panel became coal-black and opaque, whereas a film of polymer made according to my invention and baked on a steel panel is transparent and shows but little discoloration.

EXAMPLE 4

Two hundred and forty-six parts of diallyl phthalate are admixed with 108 parts of methallyl alcohol and 15.3 parts of a 60% solution of tertiary-butyl hydrogen peroxide and heated at reflux for 15 hours. From the viscous reaction mixture, an aliquot of 11.2 parts is withdrawn and poured into gasoline. The precipitated copolymer is further purified by repeated solution in chloroform and precipitation with gasoline. After drying in vacuo, 6.05 parts of polymeric solid are obtained. This corresponds to a total yield of approximately 198 parts of copolymer.

One hundred parts of the crude reaction mixture are admixed with 15.0 parts of diethyl fumarate and evaporated at 25° C. and 1 mm. until distillation ceases. The residual solution is cooled and after addition of 2.0 parts of benzoyl peroxide, a sample is cured in a plate mold by heating for 23 hours at 70° C. and then for 2 hours at 120° C. The resulting transparent sheet is hard, tough and resistant to heat and solvents.

EXAMPLE 5

A mixture of 492 parts of diallyl phthalate, 252 parts of methallyl alcohol and 24.8 parts of a 60% solution of tertiary-butyl hydrogen peroxide is heated at reflux for 25 hours. Eleven and thirty-five hundredths parts of the crude reaction mixture are withdrawn and poured into gasoline. The precipitated copolymer is further purified by repeated solution in chloroform and precipitation with gasoline. After drying in vacuo, 6.23 parts of polymeric solid are obtained which corresponds to a total yield of approximately 410 parts of the copolymer. A 70% solution of the copolymer in acetone has a viscosity of 15.2 poises at 25° C.

a. The remainder of the crude reaction mixture is diluted with a total of 300 ml. of xylene and heated at approximately 35° C. and 4 mm. until 30 parts of a mixture of xylene and methallyl alcohol has distilled out. A sample of the resulting solution of the copolymer in xylene is diluted with 25% by weight of acetone and flowed onto a glass panel. After baking at 200° C. for 120 minutes, a clear film is obtained which shows excellent resistance to attack by acetone.

b. The tolerance of the copolymer for aromatic solvents is demonstrated by diluting another sample of the above xylene solution with additional xylene until the solvent constitutes 3300% of the dissolved solids. The resulting solution is still clear and homogeneous.

EXAMPLE 6

A modified alkyd resin is prepared from the copolymer of Example 5 above by first heating a mixture of 48.0 parts of the copolymer and 70.8 parts of linseed oil monoglyceride in the presence of 10.0 parts of xylene at 180° C. until the mixture becomes homogeneous, which requires approximately 2.0 hours. Twenty-nine and six-tenths parts of phthalic anhydride are then added and the heating is continued for 3.5 additional hours during which time the reaction temperature is gradually raised from 180° C. to 230° C.

The resulting clear varnish has an acid number of 4.5, and 4.58 parts of the varnish are admixed with 2.75 parts of xylene containing dissolved therein 0.00182 part of manganese naphthenate. The mixture is flowed onto a glass panel and baked for 1 hour at 150° C. to yield a clear, tough acetone-resistant film.

Having thus described my invention, what I claim and desire to protect by Letters Patent is:

1. An acetone-soluble, fusible copolymer of a binary mixture of monomers consisting solely of a diallylic phthalate monomer selected from the class consisting of diallyl phthalate, and dimethallyl phthalate monomers and an allylic alcohol monomer in which the allylic radical is selected from the class consisting of allyl, beta-alkylallyl, and gamma-alkylallyl radicals, said copolymer containing residual unsaturation and being capable of further polymerization.

2. An acetone-soluble, fusible copolymer of a binary mixture of monomers consisting solely of diallyl phthalate and allyl alcohol, said copolymer containing residual unsaturation and being capable of further polymerization.

3. An acetone-soluble, fusible copolymer of a binary mixture of monomers consisting solely of diallyl phthalate and methallyl alcohol, said copolymer containing residual unsaturation and being capable of further polymerization.

4. A process which comprises polymerizing by heat with the aid of a peroxy catalyst a mixture of monomers consisting solely of a monomeric diallylic phthalate selected from the class consisting of diallyl phthalate, and dimethallyl phthalate monomers and a monomeric allylic alcohol in which the allylic radical is selected from the class consisting of allyl, beta-alkylallyl, and gamma-alkylallyl radicals, the proportion of the alcohol being at least 10% of the weight of the phthalate, to a point short of incipient gelation, whereby to form an acetone-soluble, fusible unsaturated copolymer of the said diallylic phthalate and the said allylic alcohol.

5. A process which comprises polymerizing by heat with the aid of a peroxy catalyst a mixture of monomers consisting solely of diallyl phthalate and allyl alcohol, the proportion of the alcohol being at least 10% of the weight of the phthalate, to a point short of incipient gelation, whereby to form an acetone-soluble, fusible unsaturated copolymer of the diallyl phthalate and the allyl alcohol.

6. A process which comprises polymerizing with the aid of a peroxy catalyst a mixture of monomers consisting solely of diallyl phthalate and methallyl alcohol, the proportion of the alcohol being at least 10% of the weight of the phthalate, for a period less than required for separation of a gelled product whereby to form an acetone-soluble, fusible unsaturated copolymer of the diallyl phthalate and the methallyl alcohol.

PLINY O. TAWNEY.

REFERENCES CITED

The following references are of record in the file of this patent:

UNITED STATES PATENTS

| Number | Name | Date |
| --- | --- | --- |
| 2,332,900 | D'Alelio | Oct. 26, 1943 |
| 2,378,195 | D'Alelio | June 12, 1945 |
| 2,378,197 | D'Alelio | June 12, 1945 |
| 2,441,516 | Snyder | May 11, 1948 |
| 2,504,052 | Snyder | Apr. 11, 1950 |

FOREIGN PATENTS

| Number | Country | Date |
| --- | --- | --- |
| 566,344 | Great Britain | Dec. 27, 1944 |